United States Patent [19]
Betts et al.

[11] Patent Number: 5,812,537
[45] Date of Patent: Sep. 22, 1998

[54] ECHO CANCELING METHOD AND APPARATUS FOR DATA OVER CELLULAR

[75] Inventors: William Lewis Betts, St. Petersburg; Ramon B. Hazen, North Redington Beach; Robert Earl Scott, Indian Rocks Beach, all of Fla.

[73] Assignee: Paradyne Corporation, Largo, Fla.

[21] Appl. No.: 536,908

[22] Filed: Sep. 29, 1995

[51] Int. Cl.$^6$ .................................................. H04B 3/20
[52] U.S. Cl. ...................... 370/286; 370/289; 370/292; 379/406; 379/410
[58] Field of Search .................. 370/291, 290, 370/289, 286, 465, 295, 210, 292; 379/410, 392, 406; 381/66, 94, 94.2, 94.3

[56] References Cited

U.S. PATENT DOCUMENTS

| | | | |
|---|---|---|---|
| 4,434,438 | 2/1984 | Rzeszewski | 348/614 |
| 4,464,545 | 8/1984 | Werner | 370/286 |
| 4,554,417 | 11/1985 | Boyer | 370/287 |
| 4,621,366 | 11/1986 | Cain et al. | 375/222 |
| 4,987,569 | 1/1991 | Ling et al. | 370/292 |
| 5,007,046 | 4/1991 | Erving et al. | 370/249 |
| 5,007,047 | 4/1991 | Sridhar et al. | 370/289 |
| 5,131,032 | 7/1992 | Esaki et al. | 379/410 |
| 5,206,854 | 4/1993 | Betts et al. | 370/286 |
| 5,263,020 | 11/1993 | Yatsuzuka et al. | 370/289 |
| 5,610,909 | 3/1997 | Shaw | 370/291 |
| 5,631,899 | 5/1997 | Duttweiler | 370/291 |

FOREIGN PATENT DOCUMENTS

| | | | |
|---|---|---|---|
| 0111938 B1 | 6/1984 | European Pat. Off. | H04B 3/23 |
| 0667700 A2 | 8/1995 | European Pat. Off. | H04M 9/08 |

OTHER PUBLICATIONS

U.S. application No. 08/137,542, Scott, filed Oct. 18, 1993.

IEEE Transactions On Communications, vol. COM–26, No. 5, May 1978, pp. 647–653, authored by Donald L. Duttweiler, entitled "A Twelve–Channel Digital Echo Canceler".

IEEE Journal On Selected Areas In Communications, vol. SAC–2, No. 2, Mar. 1984, pp. 297–303, authored by Donald L. Duttweiler, C. W. K. Gritton, Kevin D. Kolwicz and Ying G. Tao, entitled "A cascadable VLSI Echo Canceller".

ICASSP–93, 1993 IEEE International Conference on Acoustics, Speech and Signal Processing, Plenary, Special, Audio, Underwater Acoustics, VLSI, Neural Networks, vol. I of V, Apr. 27–30, 1993, Minneapolis Convention Center, Minneapolis, Minnesota, U.S.A. 93–CH3252–4.

*Primary Examiner*—Wellington Chin
*Assistant Examiner*—Melissa Kay Carman
*Attorney, Agent, or Firm*—Scott A. Horstemeyer; Thomas, Kayden, Horstemeyer & Risley, LLP

[57] ABSTRACT

A processor of a cellular modem monitors for the presence of a residual echo signal during a full-duplex portion of a training sequence. In particular, the processor monitors an equalizer error signal during a full-duplex training phase that follows the half-duplex training phase for the echo canceler. If the processor detects a level of the error signal greater than a predefined threshold, the processor presumes the increase in the error signal is due to the presence of a residual echo signal and performs a predefined adjustment of the taps of the corresponding echo canceler of the cellular modem.

25 Claims, 3 Drawing Sheets

ECHO CANCELING METHOD AND APPARATUS FOR DATA OVER CELLULAR

CROSS-REFERENCE TO RELATED APPLICATIONS

Related subject matter is disclosed in the co-pending commonly assigned, U.S. patent applications of: Betts et al., entitled "Echo Canceling Method and Apparatus for Data Over Cellular," Ser. No. 08/536,916, filed on Sep. 29, 1995; Betts et al., entitled "Echo Canceler Gain Tracker for Cellular Modems," Ser. No. 08/536,917, filed on Sep. 29, 1995.

BACKGROUND OF THE INVENTION

The present invention relates to data communications equipment, e.g., modems, and, more particularly, to echo-canceling modems.

Today, the North American cellular system is predominately an analog system sometimes referred to as AMPS (Advanced Mobile Phone Service). The corresponding cellular communications channel is sometimes referred to as an "impaired channel" since it is affected by a number of channel impairments like Rayleigh fading, co-channel interference, etc., that increase the error rate and, thus, degrade the overall performance of the mobile connection. This is in contrast to a land-line communications channel, where the predominant impairment is additive white gaussian noise (AWGN). Those in the art have realized that one way to improve data transmission rates in the cellular environment is to use a data protocol that is better suited to combating the effects of the cellular environment over the cellular portion of the data connection. One example of a cellular-oriented protocol is the "Enhanced Throughput Cellular" (ETC) protocol, developed by AT&T Paradyne.

Nevertheless, even with a cellular-oriented protocol, impairments in the cellular channel continue to limit the effective data rate over the cellular channel. For example, reliable, i.e., consistent, data transmission over 9600 bits per second (bps) is difficult to maintain.

SUMMARY OF THE INVENTION

Notwithstanding the above-mentioned impairments present in the cellular channel, we have discovered a non-linearity in the cellular AMPS network that has been affecting the ability to reliably maintain cellular data rates over 9600 bps. In particular, when a cellular modem is performing training with a far-end PSTN modem, the cellular AMPS network distorts a far-end echo signal that is used by the cellular modem to train its echo canceler. We estimate that this distortion of the far-end echo signal occurs in approximately 40% of the AMPS cellular infrastructure. The source of the distortion of the far-end echo signal is due to a non-linear compander in some base-station radios and the half-duplex approach that modems use to train echo cancelers. The result is that the echo canceler of the cellular modem is not properly trained thereby causing a residual echo signal to exist. This residual echo signal limits the maximum cellular data rate to 9600 bps (often, this cellular data rate is reduced to 7200 bps.) Without this residual echo signal, the cellular modem and PSTN modem could often achieve a data rate of 14,400 bps (and even higher in the future).

Therefore, and in accordance with the invention, we have developed a method and apparatus for reducing the residual echo signal, which is effectively caused by the above-mentioned distortion of the far-end echo signal during training. In particular, circuitry in a cellular modem detects the presence of a residual echo signal, and, in response thereto, adjusts the taps of the corresponding echo canceler by a predefined amount. As a result, this invention eliminates the incorrect training caused by the distortion of the far-end echo signal, thereby providing the ability to reliably maintain cellular data rates greater than 9600 bps.

In an embodiment of the invention, a processor of the cellular modem monitors an equalizer error signal. In particular, this monitoring occurs in a full-duplex training phase that follows the half-duplex training phase for the echo canceler. If the processor detects a level of the error signal greater than a predefined threshold, the processor presumes the increase in the error signal is due to the presence of a residual echo signal and performs a predefined adjustment of the taps of the corresponding echo canceler of the cellular modem.

This approach has an advantage in that it can work with a standard PSTN modem, i.e., no modification is required in the far-end PSTN modem.

DETAILED DESCRIPTION

Figure 1:
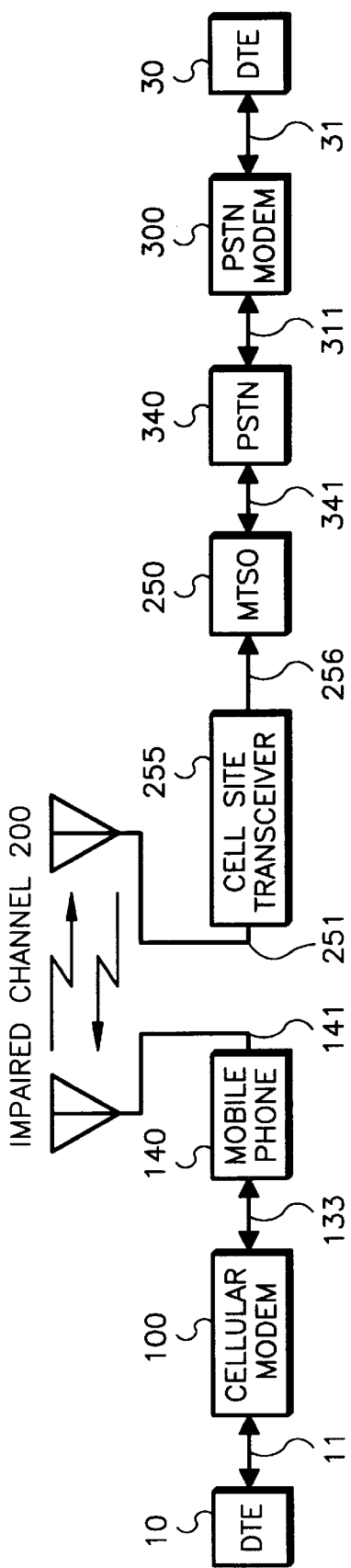
FIG. 1 is a block diagram of a mobile data communications system embodying the principles of the invention.

Other than the inventive concept, the elements of FIG. 1 function as in the prior art and will not be described in detail. FIG. 1 shows a block diagram of a mobile data communications system that includes cellular modem 100, which embodies the inventive concept. As shown, cellular modem 100 is coupled to mobile phone 140 for transmitting data signals to, and receiving data signals from, PSTN modem 300 via cell site transceiver 255, impaired channel 200, Mobile Telecommunications Switching Office (MTSO) 250, and PSTN 340. Both cellular modem 100 and PSTN modem 300 are also coupled to respective data terminal equipment (DTE) 10 and 30.

Before describing the inventive concept, the following is a brief overview of the operation of the mobile data communications system of FIG. 1 once a data connection is established, i.e., after training has been completed. A data signal is applied to cellular modem 100, via line 11, from DTE 10 for transmission to PSTN modem 300. Line 11 represents the signaling, electronics, and wiring, for conforming to a DTE/DCE (data communications equipment) interface standard like EIA RS-232. Cellular modem 100 modulates this data signal as is known in the art to, typically, a quadrature amplitude modulated (QAM) signal, which is provided via line 133 to mobile phone 140. Although not necessary to the inventive concept, it is assumed for the purposes of this example that the modem signal is compatible with International Telecommunications Union (ITU) standard V.32 bis. Mobile phone 140 further modulates this transmission signal onto a predefined cellular carrier to provide a cellular data signal to antenna 141. Cell site transceiver 255 receives the cellular data signal via antenna 251 and provides a received modem signal to MTSO 250 for transmission, via public-switched-telephone network 340, to a far-end data endpoint as represented by PSTN modem 300 and DTE 30. Ideally, the data signal received by DTE 30 from PSTN modem 300 is identical to the data signal provided by DTE 10 to cellular modem 100. Transmission of data signals in the opposite direction, i.e., from DTE 30 to DTE 10 occurs in a like fashion.

However, before establishing a data connection, modems, as known in the art, perform a standard sequence of signaling that is also referred to as hand-shaking or training. This signaling determines such parameters as data rate, modulation to use, and trains, or sets, what is known in the art as filter tap coefficient values for filters like echo cancelers and equalizers, which combat interference and distortion effects caused by the communications channel. As known in the art, the training sequence for an echo canceler is performed half-duplex. Full-duplex training of the echo canceler, while theoretically possible, is not practical from a price/performance viewpoint in the design of data communications equipment.

Figure 2:
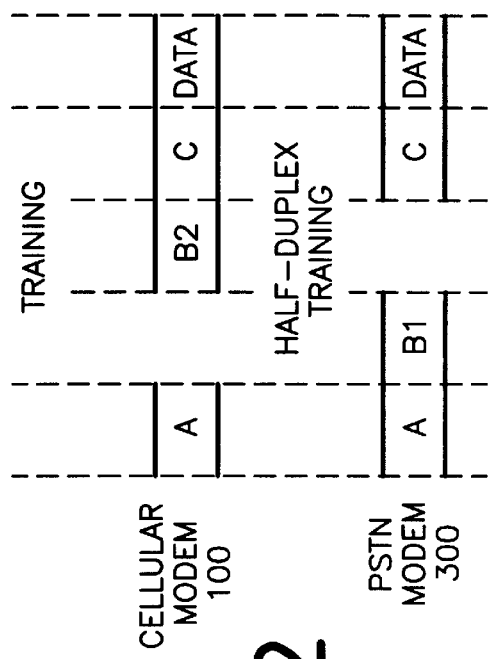
FIG. 2 shows an illustrative portion of a training sequence.

Since different data communications standards like ITU V.32 bis and ITU V.34 have different training sequences, a generalized representation of a training sequence is illustrated in FIG. 2. It is assumed that cellular modem 100 is the calling modem and that PSTN modem 300 is the answering modem. As shown in FIG. 2, the training sequence is initially full-duplex during phase "A." The latter is followed by a phase "B," which is half-duplex and is additionally divided into two portions: "B1" and "B2". In portion "B1," of phase "B," the called modem, PSTN modem 300, sends a signal to train the echo canceler of PSTN modem 300 while the cellular modem 100 is silent. Then, in portion "B2," of phase "B," the calling modem, cellular modem 100, sends a signal to train the echo canceler of cellular modem 100 while the far-end PSTN modem is silent. To complete the description of FIG. 2, after half-duplex training phase "B," both modems enter a subsequent full-duplex training phase "C," which is then followed by a "DATA" phase in which data is actually communicated between the two modems.

During the respective half-duplex training portions of phase "B," each modem uses the returned far-end echo signal to adjust the tap coefficients of its echo canceler. The far-end echo signal is a result of subsequent 4-wire to 2-wire signal conversion within the PSTN, as is known in the art. (It should be noted that other components are also adjusted during training, e.g., equalizer coefficients, etc. However, for the purposes of this example, only the echo canceler training is described.)

In the cellular network, the base station radio—cell site transceiver 255—performs audio processing. One of the audio processing stages is a compander (not shown). The compander is linear over a given signal range. Unfortunately, we have discovered that some companders are not linear in the signal range of the returned far-end echo signal during the half-duplex training phase. As a result, this non-linearity of the compander results in training the echo canceler of the cellular modem to a distorted far-end echo signal. However, when the cellular modem subsequently goes into full duplex mode, i.e., both transmitting a signal to, and receiving a signal from, the PSTN modem, the received signal level passing through cell site transceiver 255 causes the compander to operate in its linear range. This change in compander operation results in a gain change in the echo path that causes a degradation in echo canceler performance resulting in a large "residual echo" in the cellular modem. In other words, there is a loss of echo cancellation. This residual echo signal limits the maximum cellular data rate to 9600 bps (often, this cellular data rate is reduced to 7200 bps.) Without this residual echo signal, the cellular modem and PSTN modem could often achieve a data rate of 14,400 bps (and even higher in the future).

This problem can be solved by modems with a four-wire interface at the PSTN-side of the cellular data connection. For example, a cellular network that includes a cellular modem pool, as well as "mu-law" modem pools being installed at customer locations solve this problem. Unfortunately, a large number of cellular users will still be calling 2-wire PSTN modems for the foreseeable future. In addition, this problem could be solved by allowing continued adaptation of the echo canceler during data transmission. However, this adaptation process can be slow. In addition, some modems (as represented by cellular modem 100) only adapt during the training sequence to conserve hardware requirements, such as memory, and thereby reduce the cost of the data communications equipment.

Therefore, and in accordance with the invention, we have developed a method and apparatus for reducing the residual echo signal, which is effectively caused by the above-mentioned switching between a linear mode of operation and a nonlinear mode of operation of a network compander. In particular, circuitry in a cellular modem detects the presence of a residual echo signal, and, in response thereto, adjusts the taps of the corresponding echo canceler by a predefined amount. As a result, this invention eliminates the incorrect training caused by the distortion of the far-end echo signal, thereby providing the ability to reliably maintain cellular data rates greater than 9600 bps.

Figure 3:
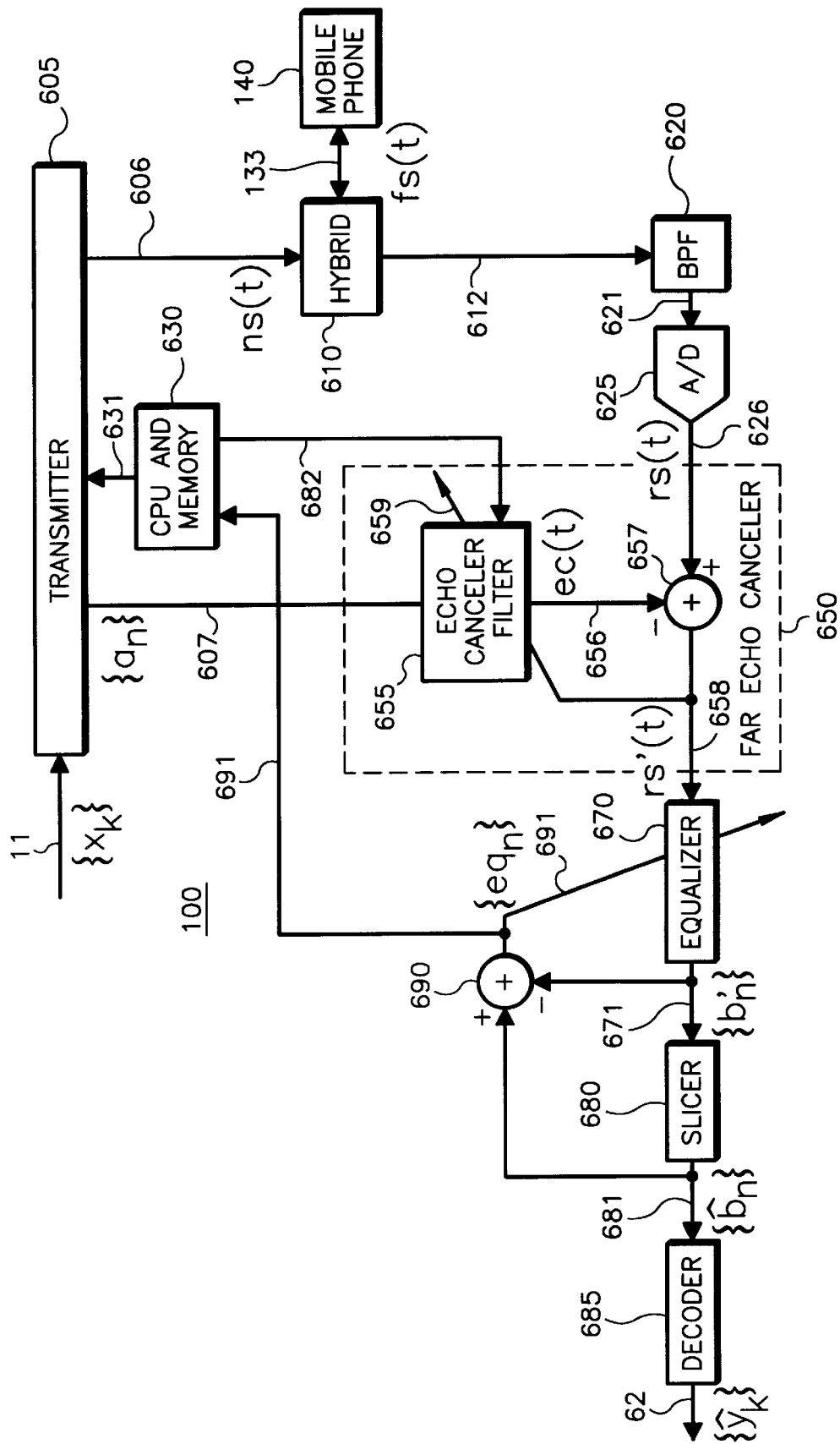
FIG. 3 is an illustrative block diagram of modem 100 of FIG. 1 embodying the principles of the invention.

In order to facilitate understanding of the inventive concept reference should now be made to FIG. 3, which represents an illustrative block diagram of cellular modem 100. Except for the inventive concept (discussed below), the structure of cellular modem 100 as illustrated in FIG. 3 is representative of prior art echo-canceling modems and the operation of the various components is well-known.

A binary input data sequence $\{x_k\}$ is provided by DTE 10 to modem 100 on line 11. This input data sequence is processed by transmitter 605 to form a near-end transmitted signal, ns(t). Illustratively, near-end transmitted signal, ns(t), represents a quadrature amplitude modulated (QAM) signal. The near-end transmitted signal, ns(t), is provided by hybrid 610 to mobile phone 140, via line 133. (It should be noted that during training, the binary input sequence is generated by cellular modem 100 as is known in the art. For simplicity, this alternate source of the binary data sequence is not shown.)

Transmitter 605 is under the control of CPU and memory 630, which is a microprocessor based central processing unit and associated memory for storing program data. It is assumed that transmitter 605 includes an encoder, shaping filter, digital to analog converter, etc., for processing and modulating the input data sequence on line 11 to provide the QAM signal, ns(t), on line 606. As part of this processing of the input data sequence, transmitter 605 represents the input data sequence as a sequence of complex-valued symbols 607 $\{a_n\}$ at nominal rate 1/T symbols per second. (This processing may also include scrambling, redundancy and other forms of encoding.) As can be seen from FIG. 3, this input data sequence is also used by far echo canceler 650 (described below).

Turning now to the other direction of communication, an analog line signal, fs(t), transmitted from a far-end modem, e.g., PSTN modem 300, is received and is directed to bandpass filter (BPF) 620. This signal is referred to as the "far-end data signal," and utilizes the same frequency band as the transmitted signal, ns(t), i.e., cellular modem 100 is a full-duplex modem. Bandpass filter 620 removes energy outside the signal passband from the far-end data signal 612 to form signal 621, which is then converted to digital form by analog-to-digital (A/D) converter 625 to form received signal rs(t).

The signal, fs(t), reaching the input of bandpass filter 620 is corrupted by so-called echo signals. Echo signals are typically introduced at each four-to-two wire conversion in the communications system.

The far-end echo signal comprises transmit signal energy from cellular modem 100 which was transmitted towards PSTN modem 300 in the first instance but was reflected back to cellular modem 100 as a result of, for example, an impedance mismatch at a two-to-four wire conversion within PSTN 340. The received signal, rs(t), provided by A/D converter 625, thus contains not only energy from the far-end data signal transmitted by PSTN modem 300, but also energy from the far-end echo signal.

Accurate recovery of the data represented by the far-end data signal requires that the echo energy present in the samples on line 626 be removed. To this end, far-end echo canceler 650 processes received signal rs(t). Far-end echo canceler 650 comprises echo canceler filter 655 and adder 657. As is known in the art, it is assumed that echo canceler filter 655 compensates for any group delay or frequency translation as necessary. Echo canceler filter 655 forms a far-end echo estimate 656, ec(t), which approximates the actual far-end echo signal present in received signal rs(t). Echo canceler 655 is essentially a filter whose transfer function is adaptively determined so as to emulate the "echo path," i.e., all filtering operations encountered by the locally transmitted symbol sequence $\{a_n\}$ from transmitter 605 through A/D converter 625. At adder 657, ec(t) is subtracted from rs(t) so as to produce, in theory, a substantially echo-free signal 658, rs'(t). Thus, rs'(t) consists primarily of the far-end signal, plus any noise introduced by the channel and the various receiver elements (e.g., quantization error introduced by analog-to-digital converter 625).

Further processing of signal rs'(t) is performed by equalizer 670, which compensates for inter symbol interference introduced by line 133, mobile phone 140, impaired channel 200, etc. Equalizer 670 provides symbol sequence 671, $\{b'_n\}$ to slicer 680. The latter operates upon the sequence $\{b'_n\}$ by quantizing the sequence $\{b'_n\}$ to form estimated symbol sequence $\{\hat{b}'_n\}$. The latter is applied to adder 690 and decoder 685, which performs a symbol-to-bit mapping function and in turn yields an estimate, $\{by'_k\}$, of a binary sequence 62, $\{y_k\}$, transmitted by the far modem, i.e., PSTN modem 300.

As noted above, during the above-mentioned half-duplex training phase, echo canceler filter 655 is initially adaptive (as illustrated by line 659, as is known in the art), and a set of complex echo canceler coefficients, $C_i$ (0<i<n, where n is typically between 100 and 150) (not shown), are set to an initial set of corresponding values, $I_i$. Note, since $C_i$ is complex, i.e., multivalued, $I_i$ is a matrix, where i represents each row. That is:

$$C_i = I_i, (0 < i < n). \quad (1)$$

Figure 4:
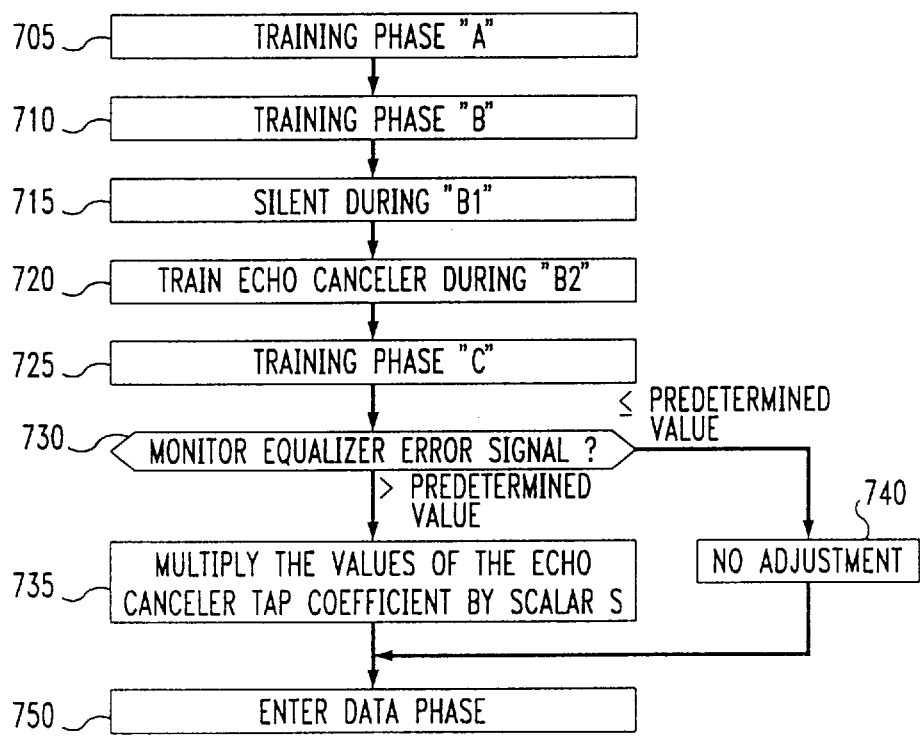
FIG. 4 is a flow diagram of an illustrative method for use in the modem of FIG. 3.

Once the half-duplex training is completed, this set of echo canceler coefficients, $C_i$, are fixed at these initial values, i.e., no more adaptation takes place. However, as noted above, once full-duplex transmission is begun, the above-mentioned compander enters its linear range of operation and changes the gain in the echo path. As a result, echo canceler filter 655 is no longer effectively removing the far-echo signal and a large residual echo signal is now present limiting the effective data rate. Therefore, and in accordance with the inventive concept, the quality of the echo canceled signal, rs'(t), is monitored by CPU 630 via line 691. The latter is simply the error signal used to adapt equalizer 670. Reference should now be made to FIG. 4, which represents a first illustrative method in accordance with the inventive concept implemented by cellular modem 100.

In step 705, cellular modem 100 enters training, e.g., representative phase "A," shown in FIG. 2. Following training phase "A," cellular modem 100 enters half-duplex training phase "B" in step 710. In this phase, cellular modem 100 is silent during portion "B1," as represented by step 715. After portion "B1," cellular modem 100 trains its own echo canceler during portion "B2," as represented by step 720, during which time PSTN modem 300 is silent. After half-duplex training portion "B2," cellular modem 100 enters full-duplex training phase "C" in step 725. In step 730, cellular modem 100, e.g., the central processing unit of CPU and memory 630 monitors the equalizer error signal via line 691. The equalizer error signal is a measure of the "hard errors" occurring in the received data signal. As known in the art, a "hard error" is simply representative of the amount of noise present on each received data symbol. Although these "hard errors" may be recoverable (to a degree) via the use of source and channel encoding techniques, in accordance with the inventive concept, this equalizer error signal is used to indicate, once full-duplex transmission occurs, whether there is an increase in residual echo. In particular, if the compander (not shown) of cell site transceiver 255 has the above-mentioned non-linearity, then—once full-duplex transmission begins—the compander moves into its linear range of operation causing a gain change in the echo path, which results in an increase in the residual echo signal of cellular modem 100. This increase in the residual echo signal causes more "hard errors" to occur, which results in a corresponding change in the value of the equalizer error signal.

If the value of the equalizer error signal is higher than a predetermined amount, K, then cellular modem 100, via the central processing unit of CPU and memory 630, adjusts the above-mentioned initial values of echo canceler coefficients, $C_i$, by a fixed scalar S in step 735, via line 682 of FIG. 3. Line 682 is representative of a data and control bus that allows the central processing unit of CPU and memory 630 to access the values of the tap coefficients of echo canceler filter 655. As a result, the value of each tap coefficient is now equal to:

$$C_i = I_i(S), (0 < i < n). \quad (2)$$

From experimentation, a value for K is 10% larger than the error signal determined during training, and S can range between 2 to 4 dB. This fixed adjustment of the tap values of the echo canceler coefficients reduces the residual echo signal to compensate for the effects of the compander (not shown) of cell site transceiver 255. It should be noted that in actuality the central processing unit of CPU and memory 630 is simply reading the current values of the tap coefficients from respective memory locations, performing (in this example) the multiplication, and then writing the new values back to the respective memory locations. This approach does not require additional circuitry (and cost) to perform continued adaptation of the echo canceler during full-duplex transmission and can be easily retrofitted into existing modems by a corresponding software change.

On the other hand, if the value of the equalizer error is less than or equal to the predetermined amount, K, then no adjustment of the echo canceler coefficients is performed in step 740.

Independent of whether step 735 or step 740 is performed, cellular modem 100 completes training and enters the "DATA" phase in step 750.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., an echo canceler, etc., the functions of any one or more of those building blocks can be carried out using one or more appropriate programmed processors, e.g., a digital signal processor.

In addition, although the inventive concept was described in the context of a cellular data connection this invention is applicable to other situations in which electronic equipment distorts the far-end echo signal. In particular, any gain change in the echo path after training the echo canceler causes a degradation in echo canceler performance. For example, it has also been discovered that some digital access arrangement (DAA) hybrids have a time-varying gain that changes the received echo level causing residual echo distortion. Also, although the inventive concept was described in the context of a calling modem, the inventive concept also applies to a called modem.

Finally, the inventive concept is also applicable to an echo canceler that adapts in the data phase, since, typically, the echo canceler adapts too slowly to the changes in the echo signal. Those skilled in the art would realize that although shown in the context of a hybrid, some cellular modems have a four-wire interface to the cellular transceiver.

What is claimed:

1. Data communications equipment apparatus comprising:
    an echo canceler for processing an echo-corrupted signal to provide an echo-canceled signal, wherein the echo canceler has a set of tap coefficients, each tap coefficient having an initial value determined during a half-duplex portion of a training sequence;
    circuitry for detecting the presence of a residual echo signal in the echo-canceled signal during full-duplex transmission that is subsequent to said half-duplex portion of the training sequence; and
    a processor, coupled to the circuitry, for adjusting each initial value of each tap coefficient by a fixed amount when the detected residual echo signal during full-duplex transmission is greater than a predetermined amount.

2. The apparatus of claim 1 wherein the circuitry for detecting the presence of the residual echo signal is an equalizer that provides an error signal which is used by the processor as an indicator of the presence of the residual echo signal.

3. The apparatus of claim 1 wherein the processor performs said adjustment during a full-duplex training phase of the training sequence subsequent to said half-duplex portion of the training sequence.

4. The apparatus of claim 1 wherein the processor performs said adjustment by multiplying each initial value of each tap coefficient by a scalar quantity.

5. The apparatus of claim 4 wherein the scalar quantity is identical for each tap coefficient.

6. Data communications equipment apparatus comprising:
    an echo canceler for processing an echo-corrupted signal to provide an echo-canceled signal, wherein the echo canceler has a set of tap coefficients, each tap coefficient having an initial value;
    circuitry for detecting the presence of a residual echo signal in the echo-canceled signal; and
    a processor, coupled to the circuitry, for adjusting each initial value of each tap coefficient by a fixed amount when the detected residual echo signal is greater than a predetermined amount during a full-duplex training phase that occurs subsequent to a half-duplex training phase.

7. The apparatus of claim 6 wherein the circuitry for detecting the presence of the residual echo signal is an equalizer that provides an error signal which is used by the processor as an indicator of the presence of the residual echo signal.

8. The apparatus of claim 6 wherein each initial value of the set of tap coefficients of the echo canceler is determined during said half-duplex training phase and wherein the echo canceler is non-adaptive during full-duplex communications.

9. The apparatus of claim 6 wherein the processor performs said adjustment during full-duplex communications in a training phase that occurs subsequent to a half-duplex training phase in which each initial value of the set of tap coefficients of the echo canceler is determined.

10. The apparatus of claim 6 wherein the processor performs said adjustment by multiplying each initial value of each tap coefficient by a scalar quantity.

11. The apparatus of claim 10 wherein the scalar quantity is identical for each tap coefficient.

12. An improved data communications equipment apparatus for receiving a data signal, the apparatus including an echo canceler for processing an echo-corrupted signal to provide an echo-canceled signal, the echo canceler having a set of tap coefficients, each tap coefficient having an initial value, wherein the improvement comprises:
    a processor for adjusting each initial value of each tap coefficient by a fixed amount during full-duplex communication which occurs subsequent to a half-duplex training phase for reducing a residual echo signal component of the echo-canceled signal.

13. The apparatus of claim 12 wherein the processor performs said adjustment if an error signal representative of the residual echo signal is greater than a predetermined value.

14. The apparatus of claim 13 wherein the error signal is provided by an equalizer of the data communications equipment apparatus.

15. The apparatus of claim 12 wherein each initial value of the set of tap coefficients of the echo canceler is determined during said half-duplex training phase.

16. The apparatus of claim 12 wherein the processor performs said adjustment during full-duplex communications in a training phase that occurs subsequent to a half-duplex training phase in which each initial value of the set of tap coefficients of the echo canceler is determined and wherein the echo cancelor is non-adaptive during full-duplex communications.

17. The appearance of claim 12 wherein the processor performs said adjustment by multiplying each initial value of each tap coefficient by a scalar quantity.

18. The apparatus of claim 17 wherein the scalar quantity is identical for each tap coefficient.

19. A method for reducing a residual echo signal in data communications equipment apparatus, the data communications equipment comprising an echo cancelor, the method comprising the steps of:
   a) performing a half-duplex training sequence with a far-end data communications equipment apparatus to determine an initial value for each one of a set of tap coefficients of the echo cancelor;
   b) subsequent to the half-duplex training sequence, performing full-duplex transmission with the far-end data communications equipment;
   c) during the subsequent full-duplex transmission, estimating a value of the residual echo signal; and
   d) adjusting the initial value of each one of the set of tap coefficients of the echo cancelor by a fixed amount only if the estimated value of the residual echo signal is greater than a predetermined amount.

20. The method of claim 19 wherein step d) is performed by using an error signal output of an equalizer of the data communications equipment apparatus.

21. The method of claim 19 wherein the full-duplex transmission of steps d) and e) is performed during a full-duplex training sequence.

22. The method of claim 19 further comprising the step of switching to a data phase after step e).

23. The method of claim 19 wherein the adjustment in step e) is performed by multiplying each initial value of the set of tap coefficients of the echo canceler by a scalar amount to establish a new set of values for the set of tap coefficients.

24. The method of claim 23 wherein the scalar amount is identical for all tap coefficients of the set.

25. The method of claim 19 wherein the echo canceler is non-adaptive subsequent to step a).

* * * * *